Figure 1:
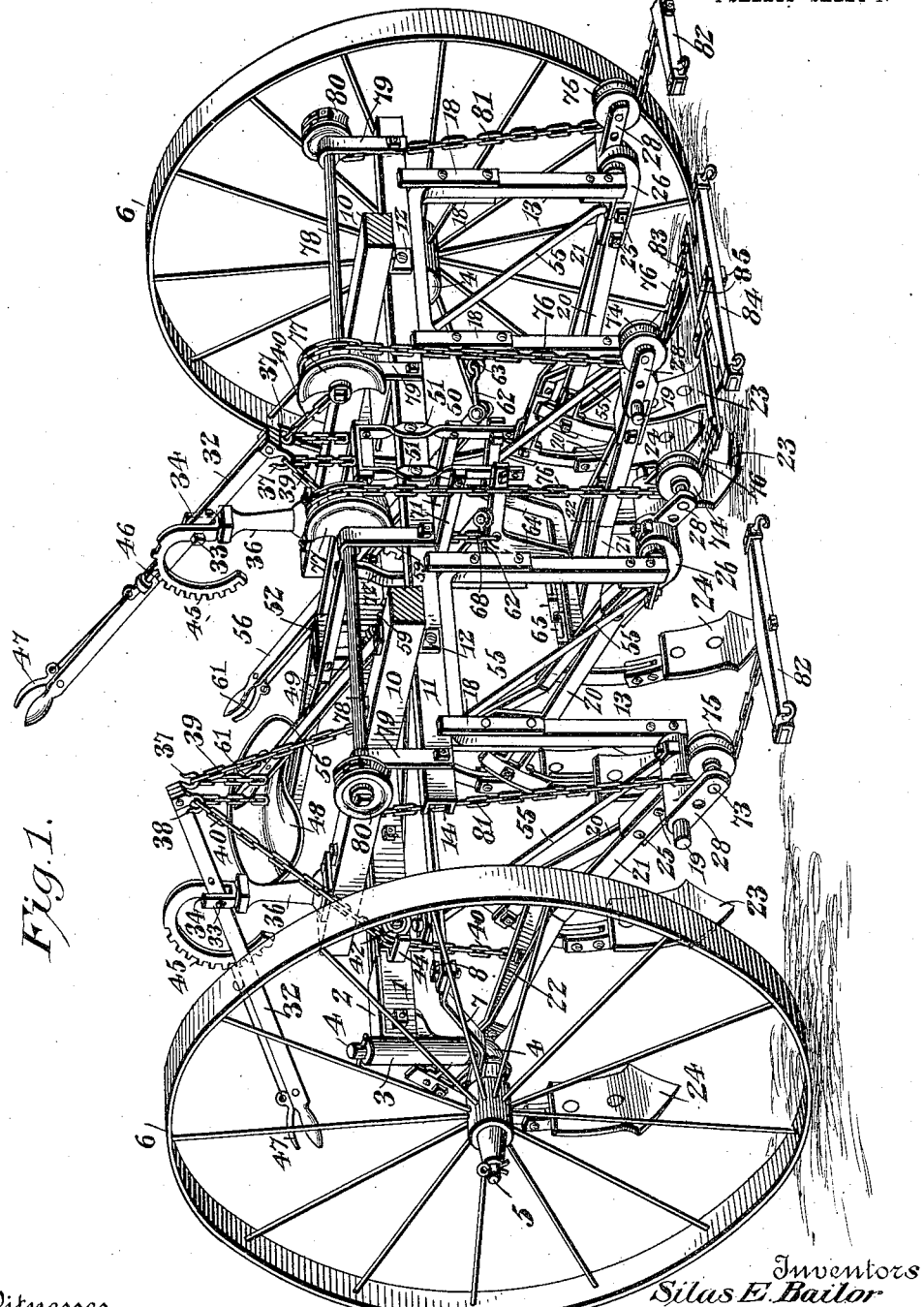

No. 862,433.

PATENTED AUG. 6, 1907.

S. E. BAILOR & F. M. ASHE.
TWO ROW CULTIVATOR.
APPLICATION FILED NOV. 3, 1905.

4 SHEETS—SHEET 2.

Witnesses
Jas. F. McCathran
T. F. Riley

Inventors
Silas E. Bailor,
F. M. Ashe,

Attorney

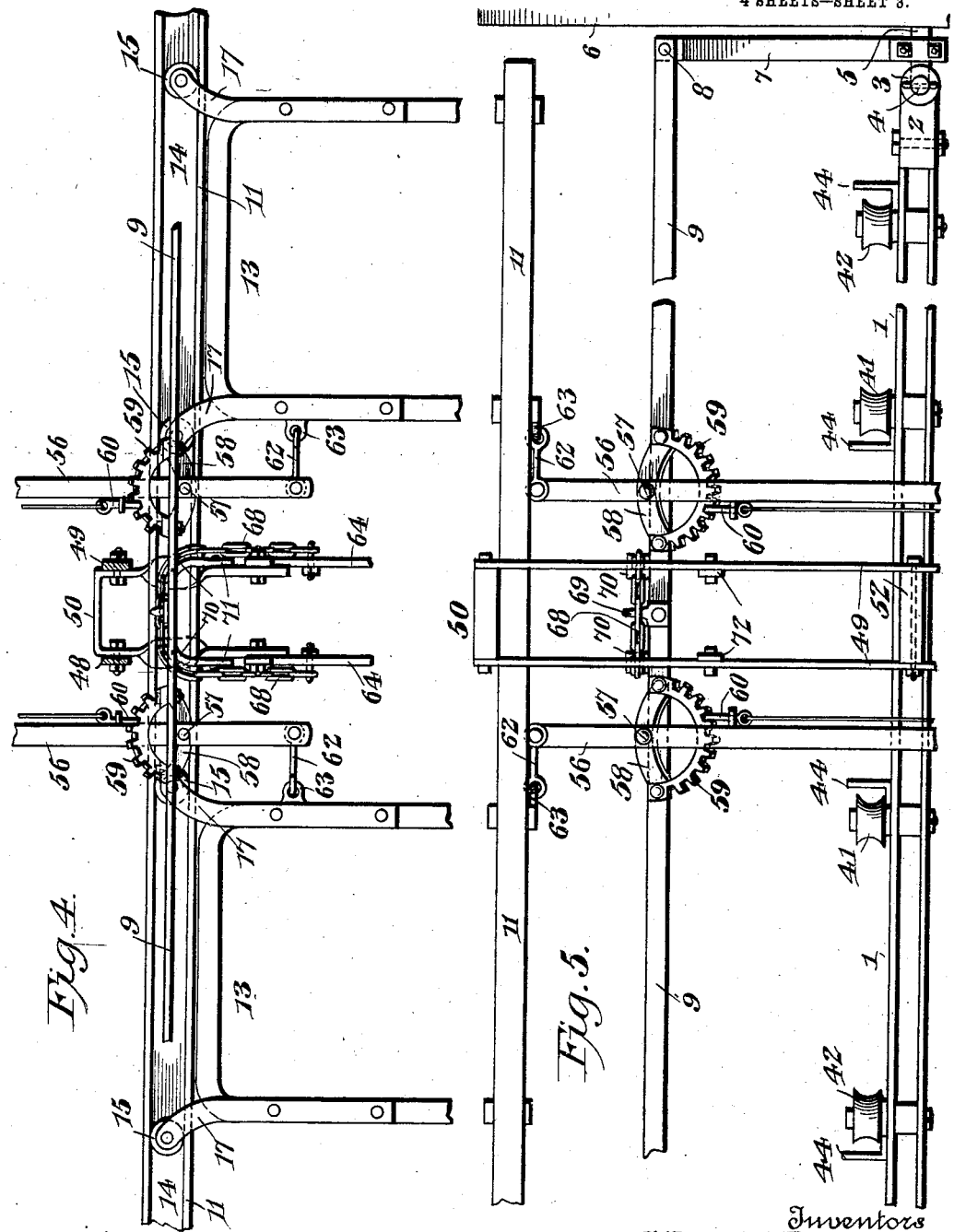

No. 862,433. PATENTED AUG. 6, 1907.
S. E. BAILOR & F. M. ASHE.
TWO ROW CULTIVATOR.
APPLICATION FILED NOV. 3, 1905.
4 SHEETS—SHEET 4.
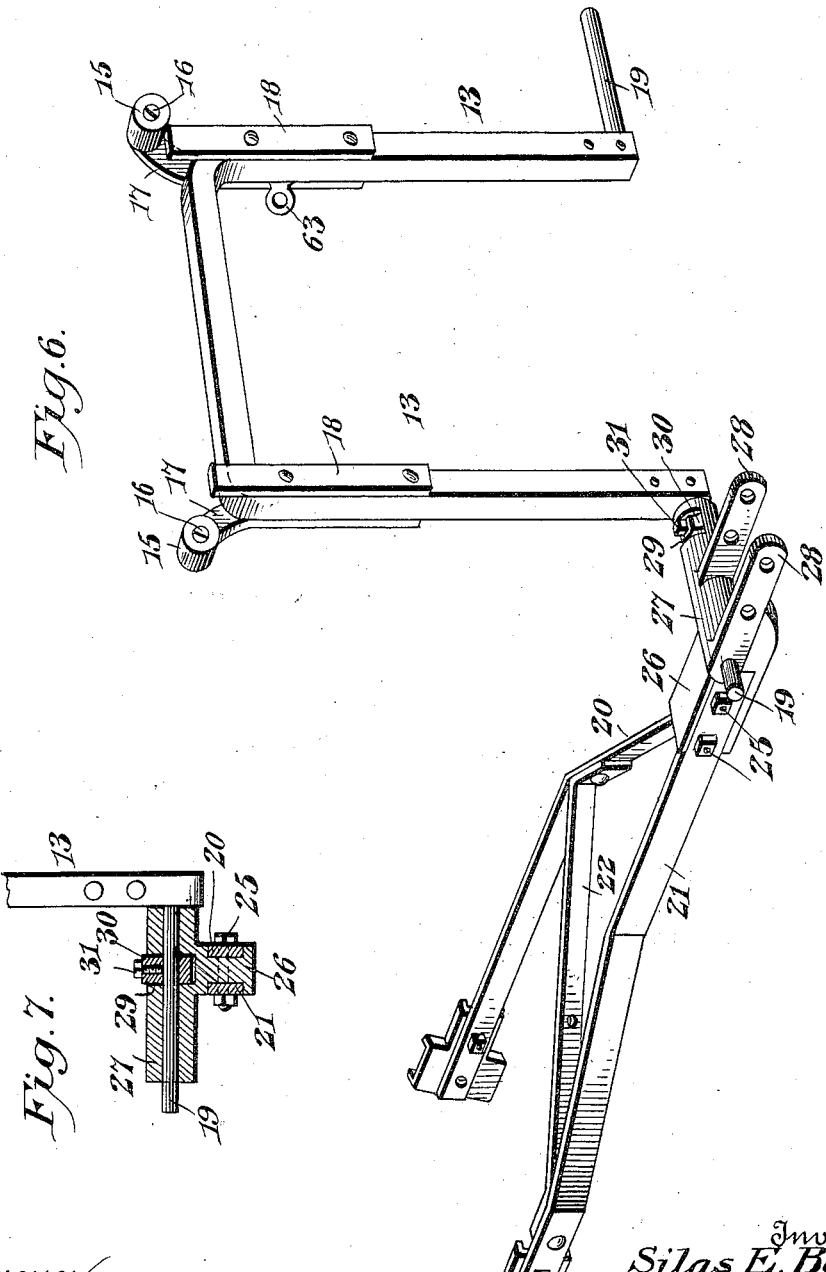

UNITED STATES PATENT OFFICE.

SILAS E. BAILOR AND FRED M. ASHE, OF TARKIO, MISSOURI.

TWO-ROW CULTIVATOR.

No. 862,433.      Specification of Letters Patent.      Patented Aug. 6, 1907.

Application filed November 3, 1905. Serial No. 285,708.

*To all whom it may concern:*

Be it known that SILAS E. BAILOR and FRED M. ASHE, citizens of the United States, residing at Tarkio, in the county of Atchison and State of Missouri, have invented a new and useful Two-Row Cultivator, of which the following is a specification.

The invention relates to improvements in two row cultivators.

The object of the present invention is to improve the construction of two row cultivators, and to provide a simple and comparatively inexpensive two row cultivator for cultivating corn, cotton and other plants in rows or drills, and to increase the adjustment of the cultivating devices, and to enable the same to be readily arranged to correspond to the width of the rows of the plants to be cultivated.

A further object of the invention is to improve the construction of that class of cultivators employing a pair of laterally adjustable arches for carrying the cultivating devices, and to enable the cultivating devices of the sides of each arch to be adjusted simultaneously for raising and lowering them either to throw them out of the ground or to arrange the shovels or other cultivating devices for operation at the desired depth.

Also the invention has for its object to enable the cultivating devices at the sides of each arch to be adjusted independently so that either the inner or outer set or gang of cultivating devices may be raised or lowered either to change the depth or throw the set or gang out of operation without changing the depth of the other set or gang of cultivating devices of such arch.

Another object of the invention is to provide means for equalizing the draft between three animals and for enabling the draft to be utilized for forcing the cultivating devices into the soil, and for also controlling the latter operation, so that the desired downward pressure of the cultivating devices may be obtained to adapt the cultivator both to the character of the soil and to the size and kind of plants under cultivation.

A further object of the invention is to improve the means for hanging the cultivating devices from the frame of the machine, and to enable such means in the adjustment of the cultivating devices to move on the frame with practically no friction.

With these and other objects in view, the invention consists in the construction and novel combination and arrangement of parts, hereinafter fully described, illustrated in the accompanying drawings, and pointed out in the claims, hereto appended; it being understood that various changes in the form, proportion, size, and minor details of construction, within the scope of the claims, may be resorted to without departing from the spirit or sacrificing any of the advantages of the invention.

Figure 2:
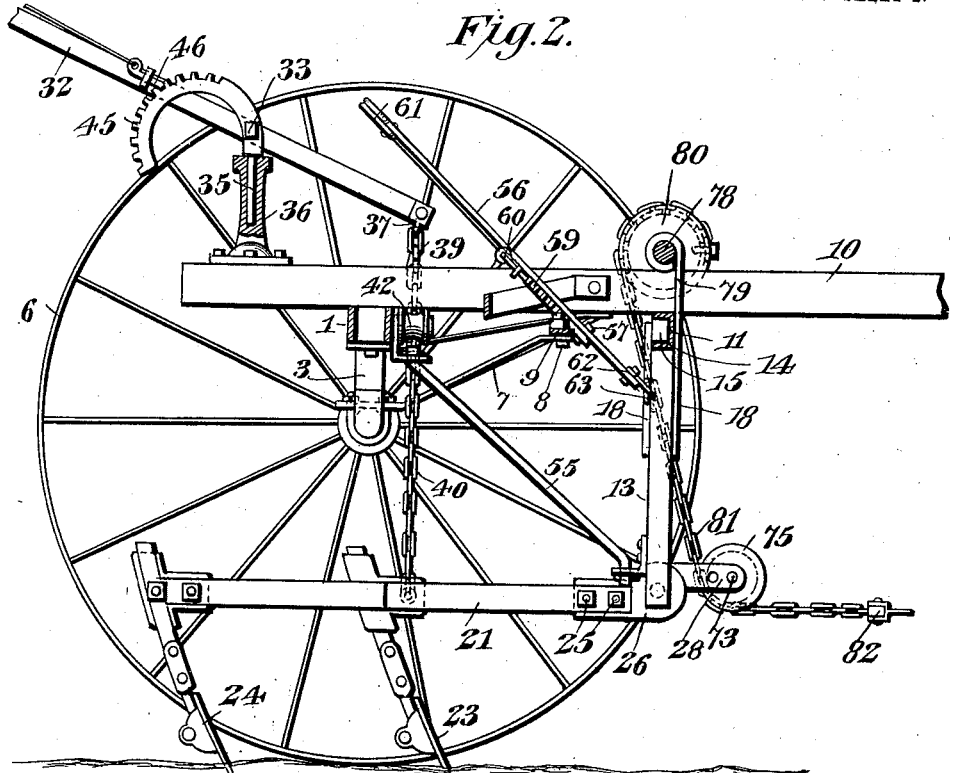
Figure 3:
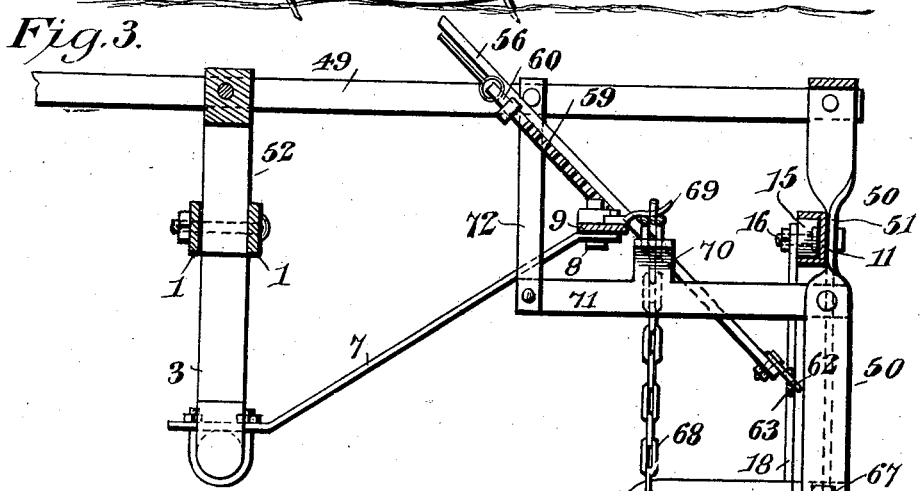

In the drawings:—Figure 1 is a perspective view of a cultivator, constructed in accordance with this invention. Fig. 2 is a vertical longitudinal sectional view. Fig. 3 is an enlarged detail vertical sectional view, illustrating the manner of mounting the treadles and the arch adjusting levers. Fig. 4 is an enlarged detail sectional view taken transversely of the machine, and illustrating the arrangement of the arch adjusting levers and the treadles. Fig. 5 is an enlarged plan view of a portion of the machine, illustrating the manner of connecting the arch adjusting levers with the shiftable connection for the crank axles. Fig. 6 is an enlarged detail perspective view of one of the laterally slidable arches and one set of plow beams. Fig. 7 is a detail sectional view, illustrating the manner of adjustably pivoting the plow beams to the sides of the arches.

Like numerals of reference designate corresponding parts in all the figures of the drawings.

1 designates an axletree preferably consisting of spaced bars or members, and provided at their ends with bearing brackets 2 having vertically alined bearings 3 for the reception of vertical pivots 4 of crank axles 5, upon which are mounted carrying wheels 6. The vertical pivots of the crank axles are suitably secured in the bearing brackets, and clipped or secured to the crank axles, are forwardly extending arms 7, which are connected at their front ends by pivots 8 with a transversely disposed shiftable bar 9, forming a shiftable connection between the crank axles and adapted to be moved transversely of the machine by the means hereinafter described for changing the position of the carrying wheels with relation to the frame of the machine for enabling the latter to be properly guided.

The machine is provided with a pair of draft beams or tongues 10 secured at their rear portions to the axletree, and supporting in advance of the same a transverse frame bar 11, constructed of channeled iron or other suitable material, and secured to the lower faces of the draft beams or tongues 10 by means of substantially L-shaped plates or knees 12, secured to the front faces of the channeled frame bar and to the lower faces of the draft beams or tongues. The transverse frame bar forms a support for a plurality of laterally slidable arches 13, which are adapted to straddle the rows, and which are slidably suspended from the transverse frame bar. The channel or groove 14 of the transverse frame bar is preferably located at the rear face of the same, the channeled frame bar consisting of upper and lower parallel horizontal flanges or portions and a vertical connecting web or body portion. The arches, which are approximately inverted U-shaped, are composed of vertical sides and a horizontal top connecting portion, and they are provided at opposite sides with a pair of upwardly extending antifriction devices consisting preferably of rollers 15, mounted on pivots 16 of arms 17, which are secured to the rear faces of the sides of the arch, and which are curved outwardly slightly in a direction laterally of the machine, as clearly illustrated in Fig. 6 of the drawings. The antifriction rollers, which are arranged in the guide groove or channel 14 of the transverse frame bar, extends forwardly into the same from the inner faces of the arms 17, and they are retained in the groove or channel by means of plates or bars 18, secured to the front faces of the sides of the arch at the upper portions thereof, and extending above the same and engaging the front face of the transverse frame bar, as clearly shown in Fig. 1 of the drawings. By this construction, the arches are slidably connected with the frame of the machine, and are adapted to move transversely thereof with a minimum amount of friction and the rollers reduce the friction both resulting from the weight of the arches and the cultivating devices hereinafter described, and also from the upward pressure on the arches.

The arches are provided at their lower ends with laterally projecting pivots 19, on which are pivotally mounted plow beams 20 and 21, arranged in pairs, each pair being equipped with suitable cultivating blades or shovels or other cultivating devices, and constituting a set or gang, the sets or gangs at opposite sides of each arch being both simultaneously and independently adjustable by the means hereinafter described, the two sets being adapted to be simultaneously raised or lowered to throw them out of the ground or to set them at the desired depth, and either set or gang being also capable of being raised or lowered for a similar purpose without changing the position of the other set. The inner and outer plow beams 20 and 21, which are connected by an angularly disposed interposed brace 22, are of unequal length, and are provided with suitable means for the attachment of the cultivating blades or shovels, the shovel or blade 23 of the short plow beam being located in advance of the long blade or shovel 24 of the plow beam. The front ends of the plow beams are detachably secured by means of bolts 25 or other suitable fastening devices to blocks or shanks 26 of bearing eyes 27, which are adjustably arranged on the laterally projecting pivots 19, and which are provided with forwardly extending arms 28. The shanks or blocks 26 and the arms 28 are preferably cast integral with the bearing eyes or sleeves 27, which, with the pivots 19, constitute couplings for connecting the plows with the arches intermediately of the former, for a purpose hereinafter described. The plow beams may be detached and reversed to arrange the front blade or shovel at either side of the gang.

Each sleeve 27 is provided adjacent to its inner end with an opening 29, in which is placed an adjustable collar 30, arranged on the laterally extending pivot 19, and provided with a set screw 31, which engages the pivot 19 for securing the gang in its adjustment. The two gangs of the arch are capable of lateral adjustment on the pivots to space them the desired distance apart to adapt them to the width of the rows of plants to be cultivated, and the adjustable collars form convenient means for securing the bearing sleeves in their adjustment. Any other suitable means, however, may be provided for adjustably securing the bearing sleeves on the laterally extending pivots, and the pivots may be of any desired length to secure the necessary range of adjustment.

The gangs of cultivating devices are raised and lowered by means of a pair of operating levers 32 fulcrumed between their ends on pivot bolts 33 in slots or bifurcations 34 of vertical pivots 35, which are mounted in vertical bearing openings of standards 36. The standards 36 are secured to the upper faces of the rear portions of the draft beams or tongues 10 at points in rear of the axletree, and the operating levers are adapted to swing vertically on the horizontal pivot bolts 33 and horizontally on the vertical pivots 35. The operating levers, which extend longitudinally of the machine, are provided at their front ends with hooks 37 and 38, arranged in pairs, and adjustably engaging inner and outer chains 39 and 40, which extend downward to spaced guide pulleys 41 and 42, and depend therefrom, the lower ends of the chains being secured by eye bolts 43 or other suitable means to the connecting bars or braces 22 of the plow beams. Any other suitable flexible connection may be employed, and the lower ends of the latter may be connected with the plow beams in any other desired manner. The chains are preferable, as the hooks 37 and 38, which engage the links of the chains, permit the latter to be readily adjusted to vary the length of the effective portions of the connections between the operating levers and the gangs of cultivating devices. The inner and outer guide pulleys 41 and 42 are preferably grooved, as shown, and the chains are retained in the grooves by means of keepers 44 consisting preferably of plates secured to the front bar or member of the axletree, and having projecting portions spaced from the guide pulleys. By swinging the operating levers upward and downward, the gangs of cultivating devices are simultaneously raised and lowered to throw them out of operation and to arrange them to operate at the desired depth. When the outer arm of the operating lever is swung outward, the outer chain is drawn upward for raising the outer gang, and by changing the inclination of the lever during such movement, the inner gang will remain undisturbed. When the rear arm of the operating lever is swung in the opposite direction, the inner chain is drawn upward, and the inner gang is raised. By swinging the operating lever horizontally, and by changing the inclination, either of the gangs may be raised or lowered independently of the other gang. This permits the two gangs of an arch to operate at different depths, and will also enable one gang to operate while the other is thrown out of operation. The chains 39 and 40 form permanent connections between the operating levers and the gangs, to the extent that the connection of one gang does not have to be detached or disconnected from the lever when it is desired to adjust the other gang independently of the first mentioned gang.

One side of the slot or bifurcation of each vertical pivot is provided with a curved extension 45, having teeth at its outer edge and forming a ratchet adapted to be engaged by a spring-actuated dog or detent 46, carried by the operating lever and operated by a latch lever 47 located adjacent to the grip or handle of the operating lever in the usual manner. The operating levers are located within easy reach of the driver, as they are arranged at opposite sides of a seat 48, mounted on a superimposed horizontal seat frame composed of two longitudinal bars 49 spaced apart and connected at their front ends with the transverse frame bar by means of a substantially inverted U-shaped bracket or hanger 50. The bracket or hanger 50, which is composed of two sides and a top connecting portion, is provided at its sides intermediate of the ends thereof with quarter bends forming flat transverse portions 51, which are bolted or otherwise secured to the front face of the transverse frame bar. The seat frame is supported at an intermediate point by means of a standard 52, which is arched or inverted U-shaped, the top of the standard being arranged between and secured to the side bars of the seat frame, and the lower ends of the sides of the standard 52 being arranged between and secured to the spaced bars or members of the axletree. The seat 48 is suitably secured to the rear ends of the side bars 49, and is located in rear of the axletree. The arches, which are braced by inclinded rods 55, are adjusted laterally of the machine by means of a pair of inclined levers 56, mounted on the transversely disposed shiftable connecting bar 9, and fulcrumed on pivot bolts 57, which pierce the levers and a pair of brackets or plates 58. The brackets or plates 58, which are bolted or otherwise secured at their ends to the bar 9, project forwardly therefrom, and have intermediate portions set at an inclination to receive the arch adjusting levers 56. The bar 9 also carries a pair of curved ratchets 59, which are engaged by spring-actuated dogs or detents 60, carried by the lever 56, and operated by suitable latch levers 61, mounted adjacent to the handles or grips of the arch adjusting levers 56. The lower or front ends of the arch adjusting levers are connected by links 62 with the inner sides of each arch. The arches are provided with suitable ears 63, into which are linked eyes of the links or rods 62. The ears 63 are preferably formed integral with the adjacent bars or pieces, which form the roller supporting arm 17. The upper ends of the arch adjusting levers are located at opposite sides of the seat, and are within easy reach of the driver, and when the rear arms of the arch adjusting levers are swung laterally, the arches are moved transversely of the frame of the machine along the transverse frame bar. As the arch adjusting levers are mounted on the shiftable bar 9, the arches are adjusted simultaneously when the direction of the carrying wheels is changed. This adjustment of the carrying wheels is effected by means of a pair of depressible treadles 64, provided at their rear ends with suitable foot plates 65, and fulcrumed at their front ends on the lower portions of the sides of the bracket or hanger 50. The sides of the bracket or hanger 50 are provided with a plurality of perforations 66, and pivot bolts 67, which pierce the front ends of the treadles, are adapted to be arranged in the several perforations for raising or lowering the front ends of the treadles. The rear ends of the treadles extend in rear of the axletree, and are arranged in convenient position to receive the feet of the driver. The treadles are secured at an intermediate point to the ends of a chain 68, which is connected at an intermediate point with the shiftable bar 9, preferably by means of a projection or spur 69, extending forwardly from the center of the bar 9, as clearly shown in Fig. 5 of the drawings. The chain extends laterally from the spur or projection 69, and its side portions pass over suitable guiding means 70, located at opposite sides of the spur or projection, and carried by bars 71, secured at their front ends to the sides of the arch or hanger 50, adjacent to the transverse frame bar, and connected at their rear ends with a pair of supporting bars 72, which are secured to and depend from the side bars 49 of the seat frame. The guiding means, which may be constructed in any desired manner, and which may consist of opposite pulleys, are provided with curved guiding faces to enable the chain to slide freely over them. The chain 68 or other suitable flexible connection is adapted to slide freely over the guides 70, when either of the treadles 64 is depressed, and the movement of the upper portion of the chain over the guides carries the shiftable bar with it and moves the same transversely of the frame to change the direction of the carrying wheels The shifting of the connection 9 results in a corresponding movement of the slidably mounted yokes, owing to the mounting of the arch adjusting levers on the shiftable connection of the crank axles.

The machine is provided with draft equalizing means, which is adapted to equalize the draft between three animals, and which is also arranged to exert a downward pressure on the rear portions of the plow beams for forcing the cultivating blades or shovels into the soil. The arms 28 are provided with a plurality of perforations for the reception of shafts or axles 73 of inner and outer guide pulleys 74 and 75, which are adjustably mounted in the arms, and which are adapted to vary the length of the effective portion of the said arms for controlling the downward pressure of the rear portions of the plow beams. Any other suitable means, however, may be employed for adjusting the guide pulleys inward and outward for this purpose. The inner guide pulleys 74 receive a pair of chains 76, which extend upwardly from the said pulley 74 to a pair of inner large mutilated pulleys 77 of transverse shafts 78. The transverse shafts 78, which are located at opposite sides of the center of the machine, are journaled in suitable bearings of inner and outer brackets 79, and carry outer small pulleys 80, which receive the upper portions of outer chains 81, and the latter extend downward from the small pulleys to the outer pulleys 75. The upper portions of the inner and outer chains are reversely arranged on the inner and outer pulleys of the shafts 78, the inner chains extending upward at the front of the large pulleys, and the outer chains extending upward at the rear of the small pulleys. The upper ends of the chains are bolted or otherwise secured to the pulleys, and the lower or front ends of the outer chains are connected directly to outer swingletrees 82, as clearly shown in Fig. 1 of the drawings. The lower or outer ends of the inner chains are connected by a transverse bar 83, to which a central swingletree 84 is connected by a pair of straps or pieces 85. The bar 83 and the straps or pieces 85 are provided to permit free movement of the intermediate swingletree 84. The inner large pulleys are twice the diameter of the outer small pulleys, so that the equalizing means will equalize the draft between a single animal connected with the intermediate swingletree and two animals hitched to the outer swingletrees 82. As the draft is exerted on the front portions of the intermediately pivoted plows, it will be clear that the rear portions will be held downward with a pressure variable with the relative lengths of the inner and outer arms of the plows. By adjusting the lower pulleys, the desired pressure may be readily obtained, and the machine may be adjusted to suit the character of the soil in which it is used.

Having thus fully described our invention, what we claim as new, and desire to secure by Letters Patent, is:—

1. In a cultivator, the combination of separate gangs of cultivating devices, an operating lever, and means for connecting the operating lever with the separate gangs of cultivating devices for raising and lowering the same both simultaneously and for also adjusting the gangs independently of each other without disconnecting either gang from the lever.

2. In a cultivator, the combination of separate gangs of cultivating devices, an operating lever, and means embodying flexible connections and guides for connecting the lever with the separate gangs of cultivating devices for raising and lowering the same simultaneously and for also adjusting the gangs independently of each other without disconnecting either of the flexible connections from the lever or from either gang.

3. In a cultivator, the combination of separate gangs of cultivating devices, an operating lever, and means for connecting the operating lever with the separate gangs of cultivating devices for simultaneously raising and lowering the same and for also adjusting the cultivating devices independently of each other, said means embodying opposite flexible connections extending from the lever to the cultivating devices, and opposite guide pulleys receiving the flexible connections.

4. In a cultivator, the combination with opposite gangs of cultivating devices, flexible connections extending from the cultivating devices, and a lever receiving the flexible connections and movable in a plurality of directions, whereby the separate gangs of cultivating devices are raised and lowered both simultaneously and independently.

5. In a cultivator, the combination with opposite gangs of cultivating devices, flexible connections extending from the cultivating devices, and a lever receiving the flexible connections and arranged to swing both vertically and horizontally, whereby it is adapted to raise and lower the separate gangs of cultivating devices both simultaneously and independently.

6. In a cultivator, the combination of separate gangs of cultivating devices, flexible connections extending from the cultivating devices, a standard, a vertical pivot mounted for rotation in the standard, and a lever receiving the flexible connections and fulcrumed on the said pivot and arranged to swing vertically on the pivot and horizontally with the pivot, whereby the lever is adapted to adjust the gangs simultaneously and also independently without disconnecting either gang from it.

7. In a cultivator, the combination of separate gangs of cultivating devices, flexible connections extending therefrom, a standard, a vertical pivot mounted in the standard and having bifurcated top portion, one of the sides of the bifurcation being extended and provided with teeth to form a ratchet, a lever pivoted in the bifurcation and receiving the flexible connections, and means carried by the lever for engaging the ratchet.

8. In a cultivator, the combination of separate gangs of cultivating devices, a lever, flexible connections extending from the cultivating devices to the lever, and means for adjustably connecting each of the flexible connections with the lever, said lever being arranged to swing vertically and horizontally, whereby it is adapted to adjust the gangs of cultivating devices simultaneously, and also independently without disconnecting either gang from it.

9. In a cultivator, the combination of separate gangs of cultivating devices, a vertically and horizontally swinging lever having hooks, and chains connected at their lower ends to the cultivating devices and having their upper ends detachably engaging the said hooks, said lever being adapted to adjust the gangs of the cultivating devices simultaneously and also independently without disconnecting either gang from it.

10. In a cultivator, the combination of a frame, opposite pivotally mounted plow beams, a lever mounted on the frame and arranged to swing vertically and horizontally, and a pair of flexible connections extending from the lever to the plow beams, whereby the latter are adjusted either simultaneously or independently without disconnecting either of the beams from the lever.

11. In a cultivator, the combination of opposite pivotally mounted plow beams arranged in pairs, braces connecting the beams of each pair, a lever fulcrumed on the frame, and opposite flexible connections extending from the lever to the plow beam, said lever being arranged to adjust the beams simultaneously or independently without disconnecting either pair of beams from it.

12. In a cultivator, the combination of a frame, opposite arches carried by the frame, separate gangs of plow beams pivotally connected with the sides of the arches, opposite operating levers mounted on the frame, and flexible connections extending from the operating levers to the separate gangs of plow beams, said levers being movable in a plurality of directions, whereby the gangs of each arch may be raised and lowered both simultaneously and independently by the lever without disconnecting either gang from the same.

13. In a cultivator, the combination of a frame, a plurality of arches slidably mounted at the top on the frame, cultivating devices carried by the arches at the bottom thereof, and means for sliding the arches on the frame.

14. In a cultivator, the combination of a frame, a plurality of arches slidably mounted at the top on the frame and movable transversely thereof, cultivating devices carried by the sides of the arches, and means for sliding the arches toward and from each other.

15. In a cultivator, the combination of a frame, a plurality of arches composed of vertical sides and a top connecting portion slidably mounted on the frame and movable transversely thereof, cultivating devices carried by the sides of the arches, and means for sliding the arches both simultaneously and independently.

16. In a cultivator, the combination of a frame provided with a transverse guide having top and bottom flanges, a plurality of arches having antifriction devices operable in the guides, cultivating devices carried by the arches, and means for adjusting the arches.

17. In a cultivator, the combination of a frame provided with a transversely-disposed frame bar having a guide groove, a plurality of arches having antifriction rollers operating in the grooves, means carried by the arches for engaging the bar to retain the rollers in the groove, and cultivating devices carried by the arches.

18. In a cultivator the combination of a frame, pivotally mounted axles, a shiftable connection for the axles, arches slidable on the frame, cultivating devices carried by the arches, and operating mechanism for the arches operable independently of the shiftable connection to vary the distance between the arches, said operating mechanism being carried by the shiftable connection, whereby the arches will be also adjusted simultaneously with the axles.

19. In a cultivator, the combination of a frame, pivotally mounted axles, a shiftable connection for the axles, arches slidable on the frame, cultivating devices carried by the arches, and operating levers mounted on the shiftable connections for adjusting the arches and adapted to adjust the latter independently of the adjustment of the said shiftable connection to vary the distance between the arches.

20. In a cultivator, the combination of a frame, pivotally mounted axles, a shiftable connection for the axles, treadles, flexible connections extending from the treadles to the shiftable connection, and oppositely disposed guides receiving the flexible connections and located at opposite sides from the point of attachment of the flexible connection to the shiftable connection.

21. In a cultivator, the combination of an arch, plow beams pivoted thereto at an intermediate point between their ends and each provided at the front end with a pulley, whiffletrees, chains connected thereto and passing around the pulleys, and equalizing means connected with the chains above the plow beams.

22. In a cultivator, the combination with plow beams pivoted at an intermediate point and each provided in advance of the pivot with pulleys, whiffletrees, flexible connections extending from the whiffletrees and passing around the pulleys, and transversely disposed equalizing means connecting the flexible connections at a point above the plow beams.

23. In a cultivator, the combination with a plow pivotally mounted between its ends and provided in advance of the pivot with a guide, and draft mechanism movable on the guide and having upwardly and forwardly extending portions, the upwardly extending portion being relatively fixed, and the forwardly extending portion having means for connecting it with the draft animals.

24. In a cultivator, the combination of a plurality of plows capable of upward and downward movement, and means for equalizing the draft and for simultaneously forcing the plows into the ground, said means having independent connections with the plows.

25. In a cultivator, the combination of a plurality of movably mounted plows, and a three horse draft equalizer having flexible connections connected with the plows and arranged to force the same into the ground.

26. In a cultivator, the combination of a plurality of intermediately pivoted plows, and a three horse draft equalizer having flexible connections connected with the front portion of the plows and arranged to swing the rear portions of the plows downward for forcing the same into the ground.

27. In a cultivator, the combination with a plurality of plows, of a draft equalizer connected with the plows for forcing the same into the ground and embodying flexible connections and pulleys of different sizes.

28. In a cultivator, the combination of a plurality of intermediately pivoted plows, and a draft equalizer comprising inner and outer pulleys of different diameters, flexible connections arranged on the pulleys and connected with the front portions of the plows, and whiffletrees connected with the flexible connections.

29. In a cultivator, the combination of a frame, opposite shafts having inner and outer pulleys of different diameters, inner and outer flexible connections reversely arranged on the pulleys, whiffletrees connected with the flexible connections, and plows having guides receiving the flexible connections.

30. In a cultivator, the combination of intermediately pivoted plows provided in advance of the pivots with pulleys, opposite shafts having inner and outer pulleys of different diameters, inner and outer flexible connections arranged on the pulleys of the shaft and passing around those of the plows, and whiffletrees connected with the flexible connections.

31. In a cultivator, the combination of intermediately pivoted plows provided in advance of the pivots with pulleys adjustable longitudinally of the plows, opposite shafts having inner and outer pulleys of different diameters, inner and outer flexible connections arranged on the pulleys of the shaft and passing around those of the plows, and whiffletrees connected with the flexible connections.

32. In a cultivator, the combination of a frame, a plurality of arches having laterally extending pivots, plows mounted on the pivots and having forwardly projecting portions, carrying pulleys, shafts mounted on the frames and having pulleys of different diameters, flexible connections arranged on the pulleys, and whiffletrees connected with the flexible connections.

33. In a cultivator, the combination of an arch having a laterally extending pivot, a plow provided with a bearing sleeve arranged on the pivot and having an opening, and an adjustable collar arranged in the opening and mounted on the pivot.

34. In a cultivator, the combination of cultivating devices, flexible connections extending from the cultivating devices, a lever receiving the flexible connections and arranged to swing vertically and horizontally, whereby the lever is adapted to adjust the cultivating devices simultaneously and also independently, and a rotatable shiftable support for the lever.

35. In a cultivator, the combination with a transverse guide, of an arch carrying rollers at the top running in the guide whereby the arch is suspended therefrom, and cultivating devices carried by the arch.

36. In combination with the frame-work including a transverse guide, an arch, cultivating devices carried by the arch, means for suspending the arch from the guide to permit the transverse movement of the arch and the corresponding movement of the cultivating devices.

In testimony, that we claim the foregoing as our own, we have hereto affixed our signatures in the presence of two witnesses.

SILAS E. BAILOR.
FRED M. ASHE.

Witnesses:
WILLIAM F. PRESTON,
A. R. WOODFORD.